US011709879B2

(12) United States Patent
Kerkes et al.

(10) Patent No.: US 11,709,879 B2
(45) Date of Patent: *Jul. 25, 2023

(54) METHODS AND APPARATUS TO DETERMINE SOURCES OF MEDIA PRESENTATIONS

(71) Applicant: The Nielsen Company (US), LLC, New York, NY (US)

(72) Inventors: Joseph Kerkes, Lutz, FL (US); Mark Richard Cave, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/565,969

(22) Filed: Dec. 30, 2021

(65) Prior Publication Data

US 2022/0121699 A1    Apr. 21, 2022

Related U.S. Application Data

(63) Continuation of application No. 15/672,605, filed on Aug. 9, 2017, now Pat. No. 11,243,997.

(51) Int. Cl.
*G06F 16/44* (2019.01)
*G06F 16/48* (2019.01)
(Continued)

(52) U.S. Cl.
CPC .............. *G06F 16/44* (2019.01); *G06F 16/41* (2019.01); *G06F 16/48* (2019.01); *G06F 21/10* (2013.01);
(Continued)

(58) Field of Classification Search
CPC .......... G06F 16/44; G06F 16/41; G06F 16/48; G06F 21/10; G06F 21/16;
(Continued)

(56) References Cited

U.S. PATENT DOCUMENTS 8,005,005 B2    8/2011 Enomoto
8,413,230 B2    4/2013 Ohta et al.
(Continued)

FOREIGN PATENT DOCUMENTS

CN    101371472 A    2/2009
CN    106877957 A    6/2017
(Continued)

OTHER PUBLICATIONS

International Searching Authority, "International Preliminary Report on Patentability," issued in connection with PCT Patent Application No. PCT/US2014/034820, dated Oct. 27, 2015, 7 pages.
(Continued)

*Primary Examiner* — Nazia Naoreen
(74) *Attorney, Agent, or Firm* — Hanley, Flight & Zimmerman, LLC

(57) ABSTRACT

Example apparatus disclosed herein are to obtain, from a network monitor, an address associated with one or more network communications used to convey a media stream to a first input device of a plurality of input devices in communication with a media device, query one or more data structures based on the address to identify a first input source of the media device, the one or more data structures to map respective ones of the plurality of input devices to corresponding ones of a plurality of input sources of the media device, the plurality of input sources including the first input source, obtain a watermark from a meter that is to monitor an output of the media device, and identify the first input source of the media device as associated with media presented by the media device in response to determination that the watermark corresponds to the media stream.

20 Claims, 4 Drawing Sheets

(51) Int. Cl.
  *G06F 21/16* (2013.01)
  *G06F 21/10* (2013.01)
  *H04N 21/8358* (2011.01)
  *H04L 67/50* (2022.01)
  *G06F 16/41* (2019.01)
  *H04L 43/04* (2022.01)
  *H04L 43/062* (2022.01)
  *H04N 21/442* (2011.01)

(52) U.S. Cl.
  CPC .............. *G06F 21/16* (2013.01); *H04L 43/04* (2013.01); *H04L 43/062* (2013.01); *H04L 67/535* (2022.05); *H04N 21/44224* (2020.08); *H04N 21/8358* (2013.01)

(58) Field of Classification Search
  CPC .......... H04N 21/44224; H04N 21/8358; H04L 67/535; H04L 43/04; H04L 43/062
  See application file for complete search history.

(56) References Cited

U.S. PATENT DOCUMENTS

| | | | |
|---|---|---|---|
| 8,881,182 | B1 | 11/2014 | Jorgensen |
| 8,973,133 | B1 | 3/2015 | Cooley |
| 9,117,442 | B2* | 8/2015 | McMillan ............. G10L 19/018 |
| 9,294,813 | B2 | 3/2016 | Lee |
| 9,300,759 | B1 | 3/2016 | Jorgensen |
| 9,749,552 | B2* | 8/2017 | Gopinath ............... G06V 20/48 |
| 10,455,632 | B2 | 10/2019 | Baron et al. |
| 11,243,997 | B2 | 2/2022 | Kerkes et al. |
| 2003/0018593 | A1 | 1/2003 | Lee |
| 2010/0103824 | A1 | 4/2010 | Gilmour |
| 2010/0228625 | A1 | 9/2010 | Priyadarshan et al. |
| 2011/0067119 | A1 | 3/2011 | Baum |
| 2011/0191811 | A1 | 8/2011 | Rouse et al. |
| 2012/0117590 | A1 | 5/2012 | Agnihotri et al. |
| 2012/0210233 | A1 | 8/2012 | Davis et al. |
| 2012/0277893 | A1 | 11/2012 | Davis et al. |
| 2013/0007298 | A1* | 1/2013 | Ramaswamy ..... H04N 21/6582 709/231 |
| 2013/0103172 | A1 | 4/2013 | McMillan et al. |
| 2013/0160042 | A1 | 6/2013 | Stokes et al. |
| 2014/0259032 | A1* | 9/2014 | Zimmerman .... H04N 21/44218 725/9 |
| 2016/0036880 | A1 | 2/2016 | Frett |
| 2016/0065441 | A1 | 3/2016 | Besehanic |
| 2016/0066005 | A1* | 3/2016 | Davis ............... H04N 21/44008 725/19 |
| 2016/0112522 | A1 | 4/2016 | Abello et al. |
| 2016/0142647 | A1 | 5/2016 | Gopinath et al. |
| 2016/0261917 | A1 | 9/2016 | Trollope et al. |
| 2019/0116334 | A1* | 4/2019 | Lim .................. H04N 21/4108 |

FOREIGN PATENT DOCUMENTS

| | | |
|---|---|---|
| JP | 2009294972 A | 12/2009 |
| WO | 2014176171 A1 | 10/2014 |

OTHER PUBLICATIONS

International Searching Authority, "Written Opinion," issued in connection with PCT Patent Application No. PCT/US2014/034820, dated Aug. 14, 2014, 6 pages.

International Searching Authority, "International Search Report," issued in connection with PCT Patent Application No. PCT/US2014/034820, dated Aug. 14, 2014, 3 pages.

International Searching Authority, "International Search Report," mailed in connection with International Patent Application No. PCT/US2018/045588, dated Nov. 30, 2018, 4 pages.

International Searching Authority, "Written Opinion," mailed in connection with International Patent Application No. PCT/US2018/045588, dated Nov. 30, 2018, 6 pages.

International Bureau, "International Preliminary Report on Patentability," mailed in connection with International Patent Application No. PCT/US2018/045588, dated Feb. 11, 2020, 7 pages.

European Patent Office, "Extended European Search Report," mailed in connection with European Patent Application No. 18844740.3, dated Mar. 15, 2021, 8 pages.

National Intellectual Property Administration of China, "First Office Action," mailed in connection with Chinese Patent Application No. 201880064294.0, dated Jun. 1, 2021, 21 pages.

Intellectual Property Office of Great Britain, "Examination Report," mailed in connection with GB Patent Application No. GP2002847.8, dated Nov. 5, 2021, 4 pages.

China National Intellectual Property Administration, "Notice of Decision of Granting Patent Right for Invention," mailed in connection with Chinese Patent Application No. 201880064294.0 dated Nov. 1, 2021, 7 pages.

United States Patent and Trademark Office "Non-Final Office Action" mailed in connection with U.S. Appl. No. 15/672,605, dated Aug. 2, 2019, 15 pages.

United States Patent and Trademark Office "Non-Final Office Action" mailed in connection with U.S. Appl. No. 15/672,605, dated Dec. 9, 2020, 18 pages.

United States Patent and Trademark Office "Final Office Action" mailed in connection with U.S. Appl. No. 15/672,605, dated Jul. 7, 2020, 18 pages.

United States Patent and Trademark Office "Final Office Action" mailed in connection with U.S. Appl. No. 15/672,605, dated Apr. 21, 2020, 19 pages.

United States Patent and Trademark Office "Final Office Action" mailed in connection with U.S. Appl. No. 15/672,605, dated Jul. 8, 2021, 22 pages.

United States Patent and Trademark Office "Notice of Allowance" mailed in connection with U.S. Appl. No. 15/672,605, dated Sep. 29, 2021, 5 pages.

European Patent Office, "Communication pursuant to Article 94(3) EPC," mailed in connection with European Patent Application No. 18844740.3, dated Sep. 6, 2022, 8 pages.

United Kingdom Patent Office, "Patents Act 1977: Entitlement to earlier date under Section 15(9)," mailed in connection with Patent Application No. GB2211314.6, dated Sep. 12, 2022, 3 pages.

United Kingdom Patent Office, "Patents Act 1977: Search Report under Section 17," mailed in connection with Patent Application No. GB2211314.6, dated Nov. 1, 2022, 1 page.

* cited by examiner

METHODS AND APPARATUS TO DETERMINE SOURCES OF MEDIA PRESENTATIONS

RELATED APPLICATION(S)

This patent arises from a continuation of U.S. patent application Ser. No. 15/672,605, which is titled "METHODS AND APPARATUS TO DETERMINE SOURCES OF MEDIA PRESENTATIONS," and which was filed on Aug. 9, 2017. Priority to U.S. patent application Ser. No. 15/672,605 is claimed. U.S. patent application Ser. No. 15/672,605 is hereby incorporated herein by reference in its entirety.

FIELD OF THE DISCLOSURE

This disclosure relates generally to media monitoring, and, more particularly, methods and apparatus to determine sources of media presentations.

BACKGROUND

Media providers and/or audience measurement entities (AME), such as, for example, advertising companies, broadcast networks, etc., are often interested in the viewing, listening, and/or media behaviors/interests of audience members and/or the public in general. To collect these behavior/interests, an AME may enlist panelists (e.g., persons agreeing to be monitored) to cooperate in an audience measurement study for a period. The media usage habits of these panelists, as well as demographic data about the panelists, are collected and used to statistically determine the size and demographics of an audience. In recent years, more consumer devices have been provided with Internet connectivity and the ability to receive streaming media from the Internet.

Figure 1:
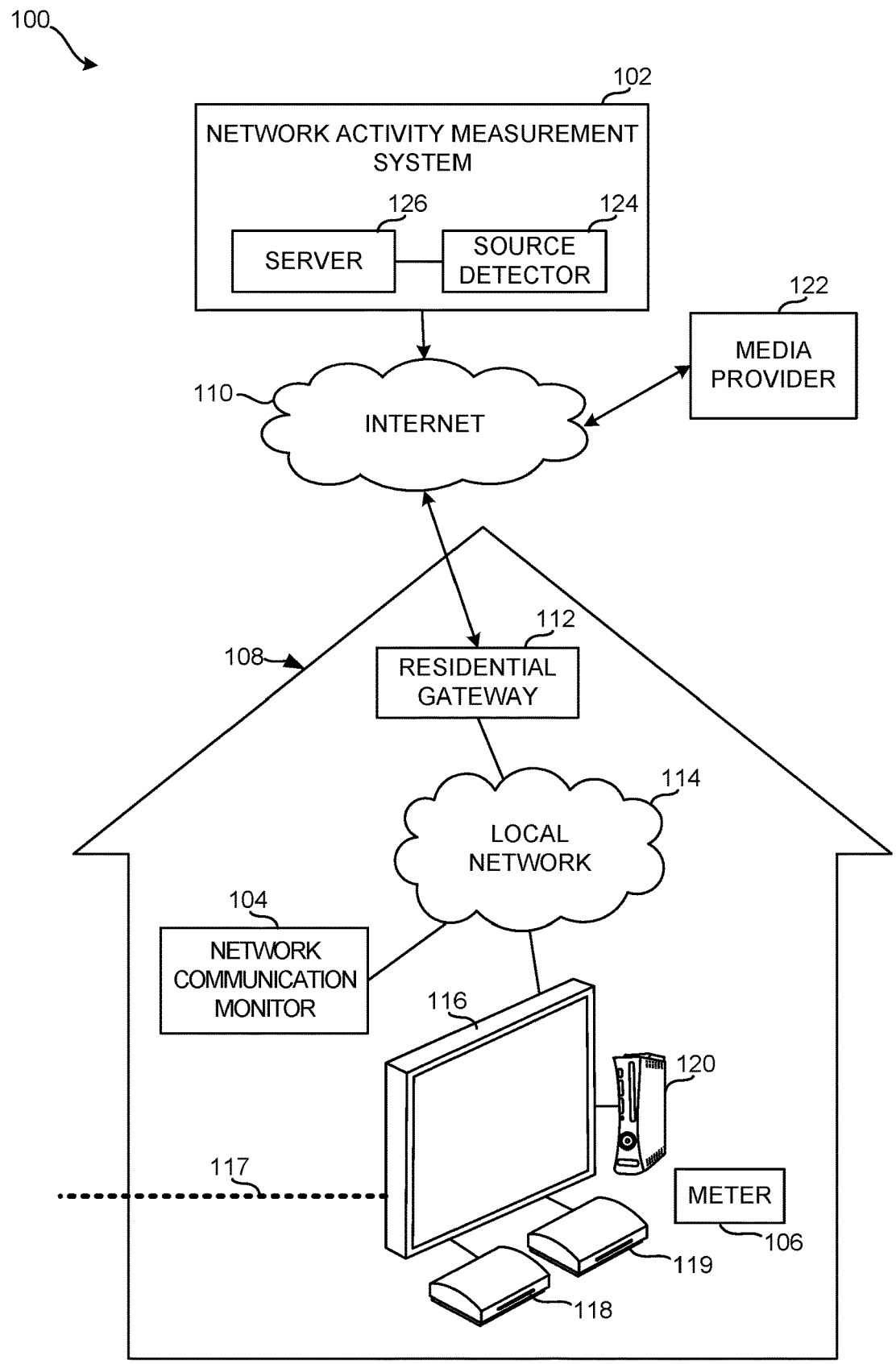
FIG. 1 is a block diagram of an example system that determine sources of media presentations, in accordance with the teachings of this disclosure.

Wherever possible, the same reference numbers will be used throughout the drawing(s) and accompanying written description to refer to the same or like parts. Connecting lines or connectors shown in the various figures presented are intended to represent example functional relationships, physical couplings and/or logical couplings between the various elements.

DETAILED DESCRIPTION

Reference will now be made in detail to non-limiting examples of this disclosure, examples of which are illustrated in the accompanying drawings. The examples are described below by referring to the drawings.

AMEs desire to identify the source of media that is being presented by a media device. Example media devices include a television, a personal computer, a laptop computer, an audio playback device, etc. Example sources can be physical input sources (e.g., input ports, input connectors, etc.), which include a high-definition multimedia input (HDMI) port, a DisplayPort port, a digital audio input source, an analog audio input source, a universal serial bus (USB) port, a digital visual interface (DVI) port, an Ethernet interface, a wireless local area network (WLAN) interface, a cellular interface, etc. Example sources can, additionally and/or alternatively, be virtual input sources. For example, media can be cast from an input device (e.g., a smartphone) to a media device over a network, on input ports, such as a multi-stream transport of DisplayPort port, that support multiple simultaneous media streams, etc. In some examples, media devices are implemented and/or instrumented with an on-device meter that monitors operations of the media device (e.g., to determine what media is presented (e.g., played, displayed, output, etc.) by the media device, what input source is active, when the media is presented, etc.). However, not all media devices are amenable to being monitored by an on-device meter. For example, some media devices do not allow installation of third-party software (e.g., an on-device meter). Further, because of the many types of media devices available, maintaining software packages for every type of media device is difficult. Because installation of a monitoring system on all types of media devices may be difficult, some networked media devices may go unmonitored.

In examples disclosed herein, network communications to/from an input device can be used to identify the media stream that is being streamed to a media device associated with the input device. For example, network communications can be used to identify that a video game console coupled to a television is receiving streaming video for presentation at the television. Example input devices include set-top boxes, video game consoles (e.g., Xbox®, PlayStation®), digital media players (e.g., a Roku® media player, a Slingbox®, Apple TV®, Amazon Fire™, Google Chromecast™, etc.), tablet computers, smartphones, personal computers, laptop computers, Chromebook™ computers, etc.

As will be described herein, using information associating input devices with input sources of a media device (e.g., a television), an input source (e.g., HDMI port 2) of the media device can be determined by identifying the input device (e.g., a video game console) and the streaming video. However, because the media device may, for example, not be turned on, may be set to a different input source, etc., the media device may not actually be presenting the streaming video. Thus, in some examples disclosed herein, an audio output associated with the media device (e.g., a speaker of the media device, a sound system coupled to the media device, etc.) is monitored to determine whether the media stream is being presented (e.g., output, displayed, played, etc.) at the media device. If a valid audience measurement watermark is identified in the audio output and, in some examples, also match the media stream being received by the input device (e.g., a video game console), then presentation of the media stream at the media device (e.g., a television) can be associated with the input source (e.g., HDMI port 2) identified using the network communications. In some examples, audience measurement watermarks, such as those developed by The Nielsen Company (US), LLC (the assignee of the present application), are used to identify the media being presented at the media device.

In some examples, the term "media" includes any type of content and/or advertisements, such as television programming, radio programming, music, news, movies, web sites, etc. In some examples, the term "media stream" refers to a plurality of network communications (e.g., Internet protocol (IP) packets), normally transmitted in an ordered sequence, that convey media from a source to a destination. In some examples, identifications of input devices, media devices and input sources are collected at audience measurement locations (e.g., homes, offices, etc.) and aggregated to determine ownership and/or usage statistics of available media devices, usage statistics of available input sources, relative rankings of usage and/or ownership of media devices, types of uses of media devices (e.g., whether a device is used for browsing the Internet, streaming media from the Internet, etc.), exposures to media (e.g., how many people watched a particular video), and/or other types of media device information.

FIG. 1 is a block diagram illustrating an example system 100 to determine input sources associated with media presentations. The example system 100 of FIG. 1 includes, at least in part, an example network activity measurement system 102, an example network communication monitor 104, and an example meter 106. The example network communications monitor 104 and the example meter 106 of FIG. 1 are located at an audience measurement location 108, such as a home, an office, etc. The example network activity measurement system 102 may be operated by, for example, an AME, such as The Nielsen Company (US), LLC. The network activity measurement system 102 is communicatively coupled to the audience measurement location 108 via a wide area network (WAN), such as the Internet 110. Electronic devices at the audience measurement location 108, such as the network communications monitor 104 are communicatively coupled to the Internet 110 via, for example, an example residential gateway 112, a modem, a WAN-to-LAN bridge, etc. An example local network 114, including any combination of one or more local area networks (LANs) and/or WLANs, communicatively couples electronic devices at the audience measurement location 108 to each other and/or to the Internet 110 via the residential gateway 112.

The example audience measurement location 108 of FIG. 1 includes an example media device 116 in the form of an example television 116, and three input devices 118, 119 and 120 of the media device 116 in the form of an example set-top box 118, an example media player box 119 and an example video game console 120. Using respective network interfaces (not shown for clarity of illustration), the input devices 118-120, and, in some examples, the media device 116 are communicatively coupled to each other and/or the Internet 110 via the local network 114 and the residential gateway 112. In the example system 100 of FIG. 1, the input device 118 is communicatively coupled to HDMI port 1 of the media device 116. However, the examples disclosed herein can be used to determine input sources for audience measurement locations having any number and/or type(s) of media devices and/or inputs devices in addition to, and/or instead of those shown in FIG. 1. In some examples, the media device 116 has input sources 117 that are not associated with streaming video, such as a cable television input, a terrestrial cable television input, etc.

In some examples, the input devices 118-120 request media from an example media provider 122 via the Internet 110. The media provider 122 may, additionally and/or alternatively, be available on a private and/or semi-private network, such as the local network 114. In some examples, the request for media is a Hypertext Transfer Protocol (HTTP) request, a Hypertext Transfer Protocol Secure (HTTPS) request, a Session Initiation Protocol (SIP) message, a domain name service (DNS) query, a file transfer protocol (FTP) request, and/or any other type of request for media (e.g., content and/or advertisements).

The example media provider 122 of the illustrated example of FIG. 1 provides media (e.g., web pages, videos, music, images, advertisements, etc.). The media provider 122 may be implemented by any provider(s) of media such as a digital broadcast provider (e.g., a cable television service, a satellite television service, a terrestrial television service, a fiber-optic television service, etc.) and/or an on-demand digital media provider (e.g., Internet streaming video and/or audio services such as Netflix®, YouTube®, Hulu®, Pandora®, Last.fm®, Amazon®, TuneIn, etc.), and/or any other provider of media services (e.g., streaming media services). In some other examples, the media provider 122 is a host for a web site(s).

In some examples, the example network communications monitor 104 of FIG. 1 is provided to a panelist, and/or otherwise delivered to the audience measurement location 108, and is connected to the local network 114. The example network communications monitor 104 monitors network communications occurring on and/or involving the local network 114. In some examples, the example residential gateway 112, or another network device coupled to the local network 114, permits custom firmware and/or software to be loaded and/or executed. In some such examples, the residential gateway 112 may be provided with firmware and/or software to implement the network communications monitor 104 (in whole or in part). In such examples, in addition to known routing and/or modem behavior, the custom firmware and/or software monitors network communications directed from the media device 116 and/or the input devices 118-120 to the Internet 110, and/or directed from the Internet 110 to the media device 116 and/or the input devices 118-120.

In some examples, the network activity measurement system 102 receives a list of media devices and input devices present in the audience measurement location 108 when a panelist enrolls in a panel. In some examples, the list of device names may be provided later, and/or may be subsequently updated. In some examples, additional information about each listed device is provided, such as, for example, a device name, a primary user of the device, a location of the device, the input source(s) to which the device is connected, etc. In some examples disclosed herein, device names are used to identify devices. Devices may be associated with a panelist and/or a household, and may have a device name (e.g., "Suzie's iPad", "Smith Family iPad 01", etc.) to facilitate identification of the media device to the panelist and/or an installer (e.g., a representative of an AME). Additionally, and/or alternatively, the panelist and/or installer may name their devices to provide some additional properties about the devices. For example, the panelist and/or installer may identify information concerning a location of a device within the panelist household (e.g., in the living room, in the basement, etc.), a primary user of the device, a manufacturer of the device, etc. In some examples, a mapping of device names to MAC addresses of the devices is made by an installer and/or by a user of the devices during a mapping procedure. However, any other party may provide device names and/or associate the device name with MAC addresses of the devices during any other procedure.

In some examples, the example network communications monitor 104 retrieves or receives the list of device names from the network activity measurement system 102, and scans the local network 114 to identify the hardware addresses (e.g., MAC addresses) of the listed devices. In some examples, the example network communications monitor 104 reports the mappings of hardware addresses to device names to the network activity measurement system 102.

The example network communications monitor 104 of FIG. 1 monitors the local network 114 for communications that are indicative of media presentations occurring in the audience measurement location 108. The example network communications monitor 104 reports the network communications monitored on the local network 114 to the network activity measurement system 102. The example network activity measurement system 102 uses the reported network communications and the mapping of hardware addresses to device names, to prepare media exposure measurement reports.

In some examples, the network communications monitor 104 of the illustrated example identifies network communications to/from the media device 116 and/or the input device(s) 118-120 within the example audience measurement location 108. In some examples, the network communications monitor 104 creates a record (e.g., a log) identifying which of the media device 116 and/or the input device(s) 118-120 were involved in which of the network communications, and transmits the record to the network activity measurement system 102. In some examples, the network communications monitor 104 determines which of the media device 116 or an input device 118-120 was involved in the network communications by inspecting the network communications received at the network communications monitor 104 for indicia that identify the media device 116 and/or the input devices 118-120, and/or may facilitate identification of the media device 116 or the input device 118-120. For example, a network address (e.g., an IP address) associated with the network communications may be used to lookup a MAC address of the media device 116 or the input device 118-120 via an address resolution protocol (ARP) table. In some examples, network communications are provided by the network communications monitor 104 to the network activity measurement system 102, and the network activity measurement system 102 identifies the MAC address of the media device 116 or the input device 118-120. In some examples, the network communications can be examined to identify that the network communications represent media streaming. For example, a uniform resource locator (URL) in a request can be used to identify that streaming media was requested.

Example methods and apparatus to identify devices on a network (e.g., the media device 116 and the input devices 118-120 on the local network 114) are disclosed in U.S. patent application Ser. No. 15/337,902, entitled "Systems, Methods and Apparatus to Facilitate Mapping a Device Name to a Hardware Address," and filed on Oct. 28, 2016; and International Patent Application Serial No. PCT/US14/34820, entitled "Systems, Methods and Apparatus to Identify Media Devices," and filed on Apr. 21, 2014. U.S. patent application Ser. No. 15/337,902, and International Patent Application Serial No. PCT/US14/34820 are hereby incorporated herein in their entirety.

To identify input sources of media devices associated with an incoming media stream, the example network activity measurement system 102 includes an example source detector 124. The example source detector 124 of FIG. 1 uses the MAC address together with the list of devices provided by, for example, a panelist or an installer to obtain the device name for the device having the identified MAC address, and the input source(s) to which the identified device is connected. For instance, an IP address included in network communications for an input device (e.g., the input device 118) is used to obtain the MAC address of the input device, and the MAC address is used to obtain the name of the input device (e.g., "set-top box") and to determine that the input device is connected to the input source HDMI 1 of a media device (e.g., the television 116). As will be disclosed below, the example source detector 124 of FIG. 1 uses information obtained by the example meter 106 to validate that media being streamed to the identified input source is being presented at the associated media device.

In some examples, the log and/or records of the network communications are transferred electronically (e.g., via the local network 114, via the Internet 110, via a USB interface, via a near field communication (NFC) interface, via a Bluetooth interface, etc.), physically transferred (e.g., a log stored on a memory device such as, for example, a flash memory, a compact disc (CD), a digital versatile disk (DVD), etc.), etc.

The network activity measurement system 102 of the illustrated example includes a server 126 that receives network communications collected by the network communications monitor 104 to generate media monitoring information. The example server 126 of the network activity measurement system 102 of FIG. 1 analyzes the network communications across multiple measurement locations, such as the example audience measurement location 108, to identify, for example, which media devices and input devices are the most owned, the most-frequently used, the least-frequently owned, the least-frequently used, the most/least-frequently used for particular type(s) and/or genre(s) of media, and/or any other media statistics or aggregate information that may be determined from the data. The media device information may also be correlated or processed with factors such as geodemographic data (e.g., a geographic location of the media exposure measurement location, age(s) of the panelist(s) associated with the media exposure measurement location, an income level of a panelist, etc.) Media device information may be useful to manufacturers and/or advertisers to determine which features should be improved, determine which features are popular among users, identify geodemographic trends, occurrence(s) related to and/or behaviors of (e.g., demographic group(s) in physical geographic area(s) (e.g., North America, Southeastern U.S., etc.)) with respect to media devices, identify market opportunities, and/or otherwise evaluate their own and/or their competitors' products. In some examples, the network activity measurement system 102 is a central measurement system that receives and/or aggregates monitoring information collected at multiple different measurement sites.

In some examples, input source information determined by the example source detector 124 is associated with media monitoring information to, for example, enable manufacturers to analyze the usage, type(s) and/or number(s) of input sources in use for different media devices, demographics, geographic location, etc.

Turning to the example meter 106, some AMEs, such as The Nielsen Company (US), LLC and/or other businesses, insert indiscernible (e.g., humanly inaudible, humanly imperceptible, etc.) watermark codes into media signals (e.g., the audio portion of a media stream). Example watermark codes identify media source, title, times, etc. In some examples, the watermark codes are inserted using critical band encoding technology (CBET) or enhanced CBET developed by The Nielsen Company (US), LLC.

The example meter 106 of FIG. 1 records watermarks detected in the audio portion of media streams, and/or records the portion(s) of the audio portion containing watermarks for subsequent transfer to the example server 126. The server 126 decodes the watermarks to measure exposure of a panelist to media signals, and determines audience exposure statistics based on the decoded watermarks. The recorded watermarks or audio portion(s) may be transferred electronically (e.g., via the local network 114, via the Internet 110, via a USB interface, via a near field communication (NFC) interface, a Bluetooth interface, etc.), physically transferred (e.g., a log stored on a memory device such as, for example, a flash memory, a CD, a DVD, etc.), etc.

Figure 2:
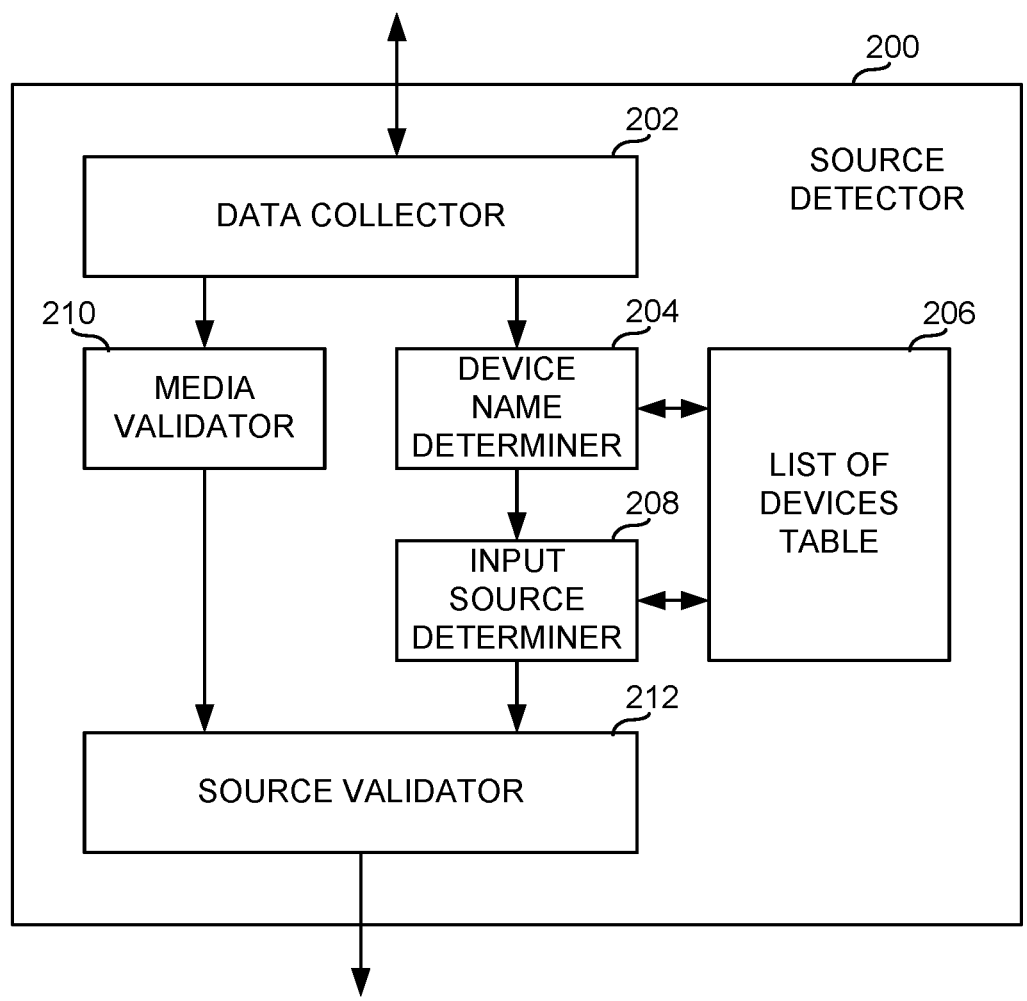
FIG. 2 is a block diagram of an example source detector that may be used to implement the example system of FIG. 1.

FIG. 2 is a block diagram of an example source detector 200 that may be used to implement the example source detector 124 of FIG. 1. To collect data, the example source detector 200 includes an example data collector 202. The example data collector 202 of FIG. 2 collects, from the network communications monitor 104, the MAC address(es) associated with a media stream, and also decoded watermark codes from the server 126, using any number and/or type(s) of interfaces, methods, etc.

To identify the device name associated with a MAC address, the example source detector 200 includes an example device name determiner 204. The example device name determiner 204 of FIG. 2 queries an example list of devices table 206, using the MAC address collected by the example data collector 202, to determine the name for the input device having the identified MAC address. The list of devices 206 includes the list of media devices and input devices and associated MAC addresses provided by, for example, a panelist or installer at enrollment, installation, at update, etc. The list of devices 206 may be implemented using any number and/or type(s) of data structures, and may be stored on any number and/or type(s) of machine readable storage media.

To identify the input source of a media device associated with the input device, the example source detector 200 includes an example input source determiner 208. The example source detector 200 of FIG. 2 queries the list of devices table 206 using the MAC address and/or identified device name to determine the input source of the media device to which the identified input device is connected.

To verify the audio output of a media device is associated with a media stream, the example source detector 200 includes an example media validator 210. The example media validator 210 examines the decoded watermarks collected from the server 126 to determine whether valid watermarks are found and, in some examples, also match the media stream associated with the identified. input device To validate the input source as associated with the media being presented by the media device, the example source detector 200 includes an example source validator 212. The example source validator 212 of FIG. 2 identifies the identified input source as valid when the decoded watermarks are associated with the media streaming to the identified input device, and indicates to the server 126 that the input source is associated with the media stream presented by the media device associated with the identified input device. Otherwise, the source validator 212 indicates to the server 126 that the input source is not associated with the media stream.

While an example manner of implementing the source detector 124 of FIG. 1 is illustrated in FIG. 2, one or more of the elements, processes and/or devices illustrated in FIG. 2 may be combined, divided, re-arranged, omitted, eliminated and/or implemented in any other way. Further, the example data collector 202, the example device name determiner 204, the example list of devices table 206, the example input source determiner 208, the example media validator 210, the example source validator 212, and/or, more generally, the example source detector 124 of FIG. 1 may be implemented by hardware, software, firmware and/or any combination of hardware, software and/or firmware. Thus, for example, any of the example data collector 202, the example device name determiner 204, the example list of devices table 206, the example input source determiner 208, the example media validator 210, the example source validator 212, and/or, more generally, the example source detector 124 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 202, the example device name determiner 204, the example list of devices table 206, the example input source determiner 208, and the example media validator 210 is/are hereby expressly defined to include a non-transitory computer readable storage device or storage disk such as a memory, a DVD, a CD, a Blu-ray disk, etc. including the software and/or firmware. Further still, the example source detector 124 of FIG. 1 may include one or more elements, processes and/or devices in addition to, and/or instead of, those illustrated in FIG. 2, and/or may include more than one of any or all the illustrated elements, processes and devices.

Figure 3:
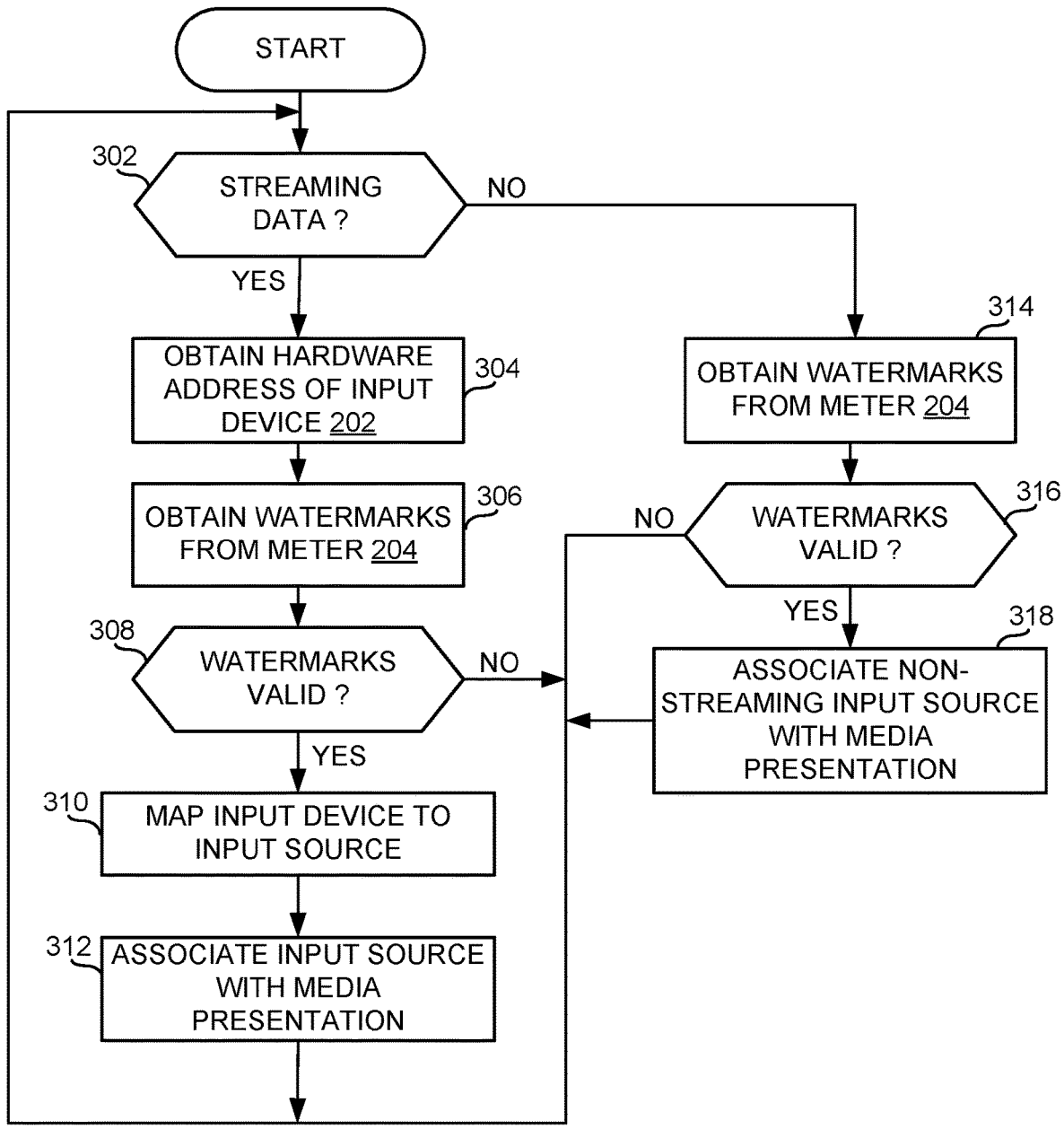
FIG. 3 is a flowchart representing example processes that may be implemented as machine readable instructions, which may be executed to implement the example source detector of FIG. 1 and/or FIG. 2 to detect sources of media presentations, in accordance with the teachings of this disclosure.

FIG. 3 is a flowchart representative of example machine readable instructions for implementing the source detector 124 of FIG. 1 and/or the example source detector 200 of FIG. 2 is shown in FIG. 3. In this example, the machine readable instructions comprise a program for execution by a processor such as the processor 410 shown in the example processor platform 400 discussed below in connection with FIG. 4. The program may be embodied in software stored on a non-transitory computer readable storage medium such as a CD, a floppy disk, a hard drive, a DVD, a Blu-ray disk, or a memory associated with the processor 410, but the entire program and/or parts thereof could alternatively be executed by a device other than the processor 410 and/or embodied in firmware or dedicated hardware. Further, although the example program is described with reference to the flowchart illustrated in FIG. 3, many other methods of implementing the example source detector 124 and the example source detector 200 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, a field programmable gate array (FPGA), an ASIC, a comparator, an operational-amplifier (op-amp), a logic circuit, etc.) structured to perform the corresponding operation without executing software or firmware.

As mentioned above, the example program of FIG. 3 may be implemented using coded instructions (e.g., computer and/or machine readable instructions) stored on a non-transitory computer and/or machine readable medium such as a hard disk drive, a flash memory, a read-only memory, a CD, a DVD, a Blu-ray disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk, to exclude propagating signals, and to exclude transmission media.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B.

The example program of FIG. 3 includes the example network communications monitor 104 determining whether there is a media stream (block 302). If there is a media stream (block 300), the example data collector 202 obtains the hardware address (e.g., a MAC address) of an input device receiving the detected media stream (block 304). In some examples, the data collector 202 also obtains the watermarks (if any) recorded for audio portions of media being presented at a media device associated with the input device (block 306). If the example media validator 210 determines that valid watermarks are found and, in some examples, also match the media stream being received by the input device (block 308), the example device name determiner 204 and the example input source determiner 208 map the input device to an input source of the media device (block 310). For example, the device name determiner 204 maps the hardware address to a name of the input device, and the input source determiner 208 maps the name of the input device with the input source of the media device connected to the input device. In some examples, the input source is determined based on the hardware address. The example source validator 212 associates the identified input source with the media presentation at the media device (block 312). Control returns to block 304 receive another hardware address.

Returning to block 308, if the media validator 210 does not identify valid watermarks in the audio output of the media device (block 308), the input source associated with the identified input device is not used for input source determination.

Returning to block 302, if the network communications monitor 104 does not detect a media stream (block 302), the example data collector 202 obtains the watermarks (if any) recorded for audio portions of media being presented at a media device (block 314). If the media validator 210 identifies that the watermarks are valid (block 316), the example source validator 312 associates the media being presented at the media with a non-streaming input source (e.g., an antenna port, a CD player connected to an HDMI port, etc.) of the media device (block 318).

In some examples, the example process(es) of FIG. 3 are repeated during the presentation of a media stream to detection conditions when presentation of the media stream has ceased, been paused, been rewound, been advanced, etc. For example, the media device has been turned off, input source selection has changed, etc.

Figure 4:
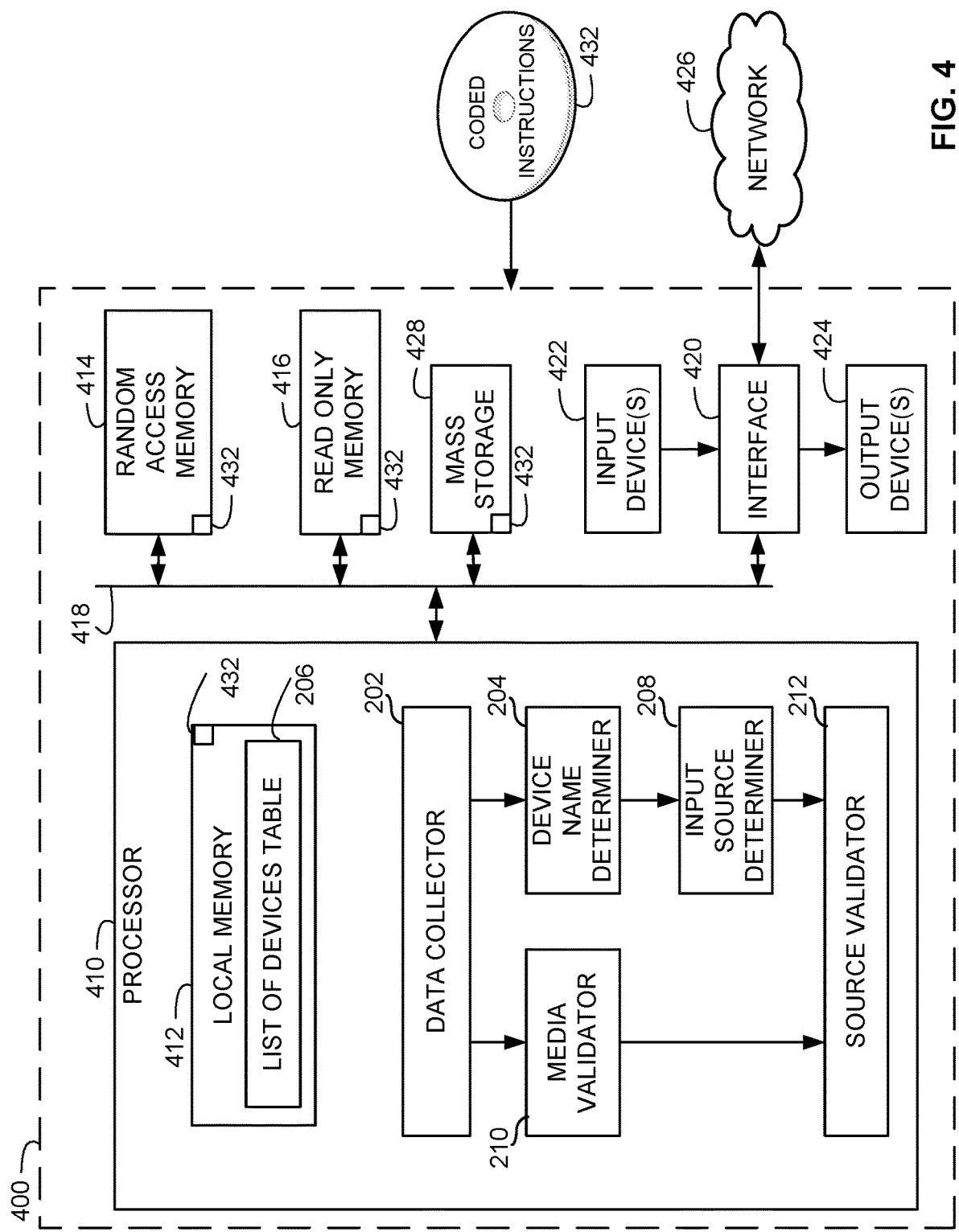
FIG. 4 is a block diagram of an example processor platform structured to execute the example machine readable instructions of FIG. 3 to implement the example source detector of FIG. 1 and/or FIG. 2.

FIG. 4 is a block diagram of an example processor platform 400 structured to execute the instructions of FIG. 3 to implement the source detector 124 of FIG. 1 and/or the example source detector 200 of FIG. 2. The processor platform 400 can be, for example, a server, a personal computer, a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set-top box, or any other type of computing device.

The processor platform 400 of the illustrated example includes a processor 410. The processor 410 of the illustrated example is hardware. For example, the processor 410 can be implemented by one or more integrated circuits, logic circuits, microprocessors, GPUs, DSPs or controllers from any desired family or manufacturer. The hardware processor may be a semiconductor based (e.g., silicon based) device. In this example, the processor implements the example data collector 202, the example device name determiner 204, the example input source determiner 208, the example media validator 210, and the example source validator 212.

The processor 410 of the illustrated example includes a local memory 412 (e.g., a cache). The processor 410 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller. In this example, the example local memory 412 stores the example list of devices table 206. However, the list of devices 206 may also be stored in, for example, the volatile memory 414 and/or the non-volatile memory 416.

The processor platform 400 of the illustrated example also includes an interface circuit 420. The interface circuit 420 may be implemented by any type of interface standard, such as an Ethernet interface, a universal serial bus (USB) interface, a Bluetooth® interface, a near field communication (NFC) interface, and/or a peripheral component interface (PCI) express interface.

In the illustrated example, one or more input devices 422 are connected to the interface circuit 420. The input device(s) 422 permit(s) a user to enter data and/or commands into the processor 410. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, etc.), a tactile output device, a printer and/or a speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem and/or network interface to facilitate exchange of data with external machines (e.g., computing devices of any kind) via a network 426 (e.g., an Ethernet connection, a digital subscriber line (DSL), a telephone line, a coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, CD drives, Blu-ray disk drives, redundant array of independent disks (RAID) systems, and DVD drives.

Coded instructions 432 including the coded instructions of FIG. 3 may be stored in the mass storage device 428, in the volatile memory 414, in the non-volatile memory 416, and/or on a removable tangible computer readable storage medium such as a CD or DVD.

From the foregoing, it will be appreciated that example methods and apparatus have been disclosed that determine input sources associated with media exposures. Further examples and combinations thereof include at least the following:

Example 1 is a method to determine an input source associated with a media presentation, the method including identifying, by executing an instruction with a processor, an input source of a media device from network communications associated with a media stream, and when an audio output associated with the media device includes a valid audience measurement watermark, associating, by executing an instruction with the processor, the input source with media presented by the media device.

Example 2 is the method of example Error! Reference source not found., further including determining whether the valid audience measurement watermark is associated with the media stream, and associating the input source with the media presented by media device when the valid audience measurement watermark is determined to be associated with the media stream.

Example 3 is the method of example Error! Reference source not found. or 2, further including associating the media presentation at the media device with a non-streaming input source when the audio output does not include the valid audience measurement watermark.

Example 4 is the method of any of examples Error! Reference source not found. to 3, further including obtaining a hardware address of an input device, and obtaining the audience measurement watermark, wherein the hardware address and the audience measurement watermark are received from different devices at an audience measurement location.

Example 5 is the method of example Error! Reference source not found., wherein identifying the input source of the media device includes identifying the input device based on the hardware address, and identifying the input source of the media device based on the input device.

Example 6 is the method of example Error! Reference source not found., wherein the hardware address is identified based on the network communications.

Example 7 is the method of any of examples Error! Reference source not found. to 6, wherein the input source includes at least one of a high-definition multimedia input (HDMI) port, a DisplayPort port, a digital audio input source, an analog audio input source, a universal serial bus (USB) port, a digital visual interface (DVI), an Ethernet interface, a wireless local area network (WLAN) interface.

Example 8 is the method of any of examples Error! Reference source not found. to 7, wherein the media device includes at least one of a television, a computer monitor, a laptop computer, a tablet, an audio playback device, or a smartphone to present the media stream.

Example 9 is an apparatus to determine an input source associated with a media presentation including an input source determiner to identify an input source of a media device from network communications associated with a media stream, a media validator to identify whether an audio output associated with the media device includes a valid audience measurement watermark, and a source validator to associate the input source with media presented by the media device when the media validator identifies the valid audience measurement watermark.

Example 10 is the apparatus of example Error! Reference source not found., wherein the media validator determines whether the valid audience measurement watermark is associated with the media stream, and the source validator associates the input source with the media presented by media device when the valid audience measurement watermark is determined to be associated with the media stream.

Example 11 is the apparatus of example Error! Reference source not found. or 10, wherein the source validator associates the media presentation at the media device with a non-streaming input source when the media stream is not detected.

Example 12 is the apparatus of any of examples Error! Reference source not found. to 11, further including a data collector to obtain a hardware address of an input device, and the audience measurement watermark.

Example 13 is the apparatus of example Error! Reference source not found., wherein the input source determiner identifies the input source of the media device by identifying the input device based on the hardware address, and identifying the input source of the media device based on the input device, wherein the hardware address is identified based on the network communications.

Example 14 is the apparatus of any of examples Error! Reference source not found. to 13, wherein the input source includes at least one of a high-definition multimedia input (HDMI) port, a DisplayPort port, a digital audio input source, an analog audio input source, a universal serial bus (USB) port, a digital visual interface (DVI), an Ethernet interface, a wireless local area network (WLAN) interface.

Example 15 is the apparatus of any of examples Error! Reference source not found. to 14, wherein the media device includes at least one of a television, a computer monitor, a laptop computer, a tablet, an audio playback device, or a smartphone to present the media stream.

Example 16 is a non-transitory computer-readable storage medium comprising instructions that, when executed, cause a machine to perform at least identifying an input source of a media device from network communications associated with a media stream, and when an audio output associated with the media device includes a valid audience measurement watermark, associating the input source with media presented by the media device.

Example 17 is the non-transitory computer-readable storage medium of example Error! Reference source not found., including further instructions that, when executed, cause the machine to perform determining whether the valid audience measurement watermark is associated with the media stream, and associating the input source with the media presented by media device when the valid audience measurement watermark is determined to be associated with the media stream.

Example 18 is the non-transitory computer-readable storage medium of any of examples Error! Reference source not found. or 17, including further instructions that, when executed, cause the machine to perform associating the media presentation at the media device with a non-streaming input source when the audio output does not include the valid audience measurement watermark.

Example 19 is the non-transitory computer-readable storage medium of any of examples Error! Reference source not found. to 18, including further instructions that, when executed, cause the machine to perform obtaining a hardware address of an input device, and obtaining the audience measurement watermark, wherein the hardware address and the audience measurement watermark are received from different devices at an audience measurement location.

Example 20 is the non-transitory computer-readable storage medium of example Error! Reference source not found., including further instructions that, when executed, cause the machine to perform identifying the input source of the media device by identifying the input device based on the hardware address, and identifying the input source of the media device based on the input device.

Example 21 is the non-transitory computer-readable storage medium of example Error! Reference source not found., wherein the hardware address is identified based on the network communications.

Example 22 is the non-transitory computer-readable storage medium of any of examples Error! Reference source not found. to 21, wherein the input source includes at least one of a high-definition multimedia input (HDMI) port, a DisplayPort port, a digital audio input source, an analog audio input source, a universal serial bus (USB) port, a digital visual interface (DVI), an Ethernet interface, a wireless local area network (WLAN) interface.

The non-transitory computer-readable storage medium of claim Error! Reference source not found., wherein the media device includes at least one of a television, a computer monitor, a laptop computer, a tablet, an audio playback device, or a smartphone to present the media stream.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform media source detection, the apparatus comprising:
   at least one memory;
   instructions; and
   processor circuitry to execute the instructions to at least:
      obtain, from a network monitor, an address associated with one or more network communications used to convey a media stream to a first input device of a plurality of input devices in communication with a media device;
      query one or more data structures based on the address to identify a first input source of the media device, the one or more data structures to map respective ones of the plurality of input devices to corresponding ones of a plurality of input sources of the media device, the plurality of input sources including the first input source;
      obtain a watermark from a meter that is to monitor an output of the media device, the meter different from the network monitor; and
      identify the first input source of the media device as associated with media presented by the media device in response to determination that the watermark corresponds to the media stream.

2. The apparatus of claim 1, wherein the address is a first address, and the processor circuitry is to:
   determine a second address of the first input device based on the first address; and
   query the one or more data structures based on the second address to identify the first input source of the media device.

3. The apparatus of claim 2, wherein the first address is an Internet protocol (IP) address, the second address is a medium access control (MAC) address, and the processor circuitry is to determine the MAC address from the IP address based on an address resolution protocol (ARP) table.

4. The apparatus of claim 3, wherein the one or more data structures are to map respective MAC addresses of the plurality of input devices to corresponding identifiers of the plurality of input devices and corresponding ones of the plurality of input sources of the media device.

5. The apparatus of claim 1, wherein address is a MAC address of the first input device, and the one or more data structures are to map respective MAC addresses of the plurality of input devices to corresponding identifiers of the plurality of input devices and corresponding ones of the plurality of input sources of the media device.

6. The apparatus of claim 1, wherein the plurality of input sources of the media device includes one or more high-definition multimedia input (HDMI) ports of the media device, and the first input device is connected to a first HDMI port of the one or more HDMI ports.

7. The apparatus of claim 1, wherein the watermark is an audio watermark.

8. At least one non-transitory computer readable medium comprising computer readable instructions that, when executed, cause at least one processor to at least:
   obtain, from a network monitor, an address associated with one or more network communications used to convey a media stream to a first input device of a plurality of input devices in communication with a media device;
   query one or more data structures based on the address to identify a first input source of the media device, the one or more data structures to map respective ones of the plurality of input devices to corresponding ones of a plurality of input sources of the media device, the plurality of input sources including the first input source;
   obtain a watermark from a meter that is to monitor an output of the media device, the meter different from the network monitor; and
   identify the first input source of the media device as associated with media presented by the media device in response to determination that the watermark corresponds to the media stream.

9. The at least one non-transitory computer readable medium of claim 8, wherein the address is a first address, and the instructions are to cause the at least one processor to:
   determine a second address of the first input device based on the first address; and
   query the one or more data structures based on the second address to identify the first input source of the media device.

10. The at least one non-transitory computer readable medium of claim 9, wherein the first address is an Internet protocol (IP) address, the second address is a medium access control (MAC) address, and the instructions are to cause the at least one processor to determine the MAC address from the IP address based on an address resolution protocol (ARP) table.

11. The at least one non-transitory computer readable medium of claim 10, wherein the one or more data structures are to map respective MAC addresses of the plurality of input devices to corresponding identifiers of the plurality of input devices and corresponding ones of the plurality of input sources of the media device.

12. The at least one non-transitory computer readable medium of claim 8, wherein address is a MAC address of the first input device, and the one or more data structures are to map respective MAC addresses of the plurality of input devices to corresponding identifiers of the plurality of input devices and corresponding ones of the plurality of input sources of the media device.

13. The at least one non-transitory computer readable medium of claim 8, wherein the plurality of input sources of the media device includes one or more high-definition multimedia input (HDMI) ports of the media device, and the first input device is connected to a first HDMI port of the one or more HDMI ports.

14. The at least one non-transitory computer readable medium of claim 8, wherein the watermark is an audio watermark.

15. A method to perform media source detection, the method comprising:
obtaining, from a network monitor, an address associated with one or more network communications used to convey a media stream to a first input device of a plurality of input devices in communication with a media device;
querying, by executing an instruction with at least one processor, one or more data structures based on the address to identify a first input source of the media device, the one or more data structures to map respective ones of the plurality of input devices to corresponding ones of a plurality of input sources of the media device, the plurality of input sources including the first input source;
obtain a watermark from a meter that is to monitor an output of the media device, the meter different from the network monitor; and
identifying, by executing an instructions with the at least one processor, the first input source of the media device as associated with media presented by the media device in response to determination that the watermark corresponds to the media stream.

16. The method of claim 15, wherein the address is a first address, and further including:
determining a second address of the first input device based on the first address; and
querying the one or more data structures based on the second address to identify the first input source of the media device.

17. The method of claim 16, wherein the first address is an Internet protocol (IP) address, the second address is a medium access control (MAC) address, and the determining of the second address includes determining the MAC address from the IP address based on an address resolution protocol (ARP) table.

18. The method of claim 17, wherein the one or more data structures are to map respective MAC addresses of the plurality of input devices to corresponding identifiers of the plurality of input devices and corresponding ones of the plurality of input sources of the media device.

19. The method of claim 15, wherein address is a MAC address of the first input device, and the one or more data structures are to map respective MAC addresses of the plurality of input devices to corresponding identifiers of the plurality of input devices and corresponding ones of the plurality of input sources of the media device.

20. The method of claim 15, wherein the plurality of input sources of the media device includes one or more high-definition multimedia input (HDMI) ports of the media device, and the first input device is connected to a first HDMI port of the one or more HDMI ports.

* * * * *